United States Patent Office 3,559,051
Patented Jan. 26, 1971

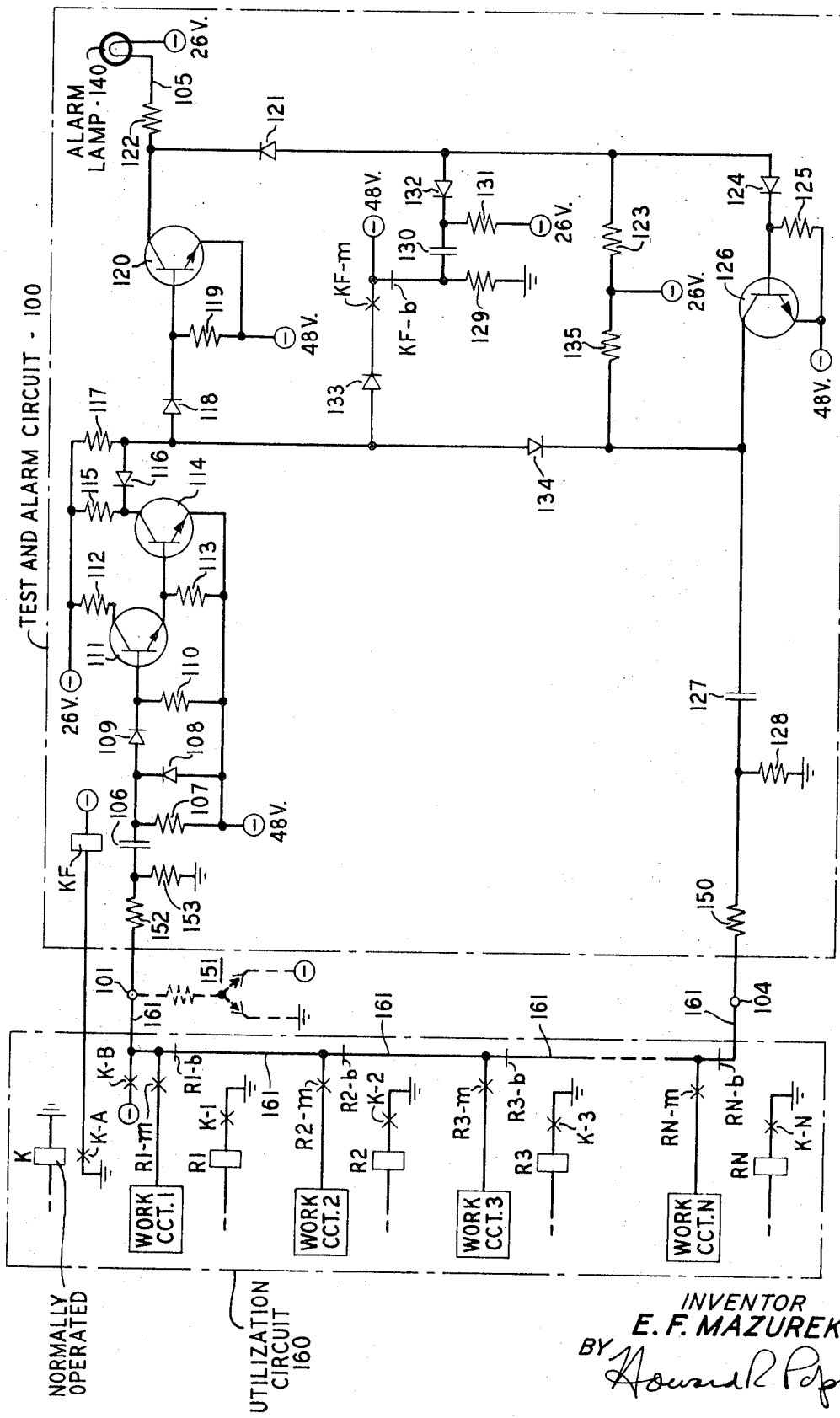

3,559,051
CIRCUIT FOR TESTING THE INTEGRITY OF AN ELECTRICAL PATH BY TRANSMISSION OF A PULSE THERETHROUGH
Edward F. Mazurek, Spotswood, N.J., assignor to Bell Telephone Laboratories, Incorporated, Murray Hill, N.J., a corporation of New York
Filed Nov. 8, 1968, Ser. No. 774,352
Int. Cl. G01r 31/02
U.S. Cl. 324—51                                          6 Claims

ABSTRACT OF THE DISCLOSURE

A fault detection circuit is disclosed for ascertaining the integrity of a path including a plurality of relay contacts. The circuit includes an arrangement for applying a test pulse to one end of the contact chain and to an alarm circuit. Receipt of the test pulse at the other end of the chain prevents the alarm from being fully operating and is indicative of both the continuity of the relay contact path and the absence of false crosses to battery or ground on the contact chain.

BACKGROUND OF THE INVENTION

This invention relates to checking circuits and more particularly to an arrangement for checking continuity of a conductor path and detecting false crosses to battery or ground on the conductor.

It has been standard practice in many applications to check continuity of a conductor path by applying a potential to one end of the path and connecting a relay to the other end. If the path were continuous, the relay would operate. Failure of the relay to operate would indicate some discontinuity in the conductor path. This same checking technique has also been applied to relay circuits, particularly of the type where a plurality of input leads are connected to a common bus via transfer contacts. To check for the proper release of the plurality of relays which control the transfer contacts in this type of circuit, the break contacts of the relays are connected in a series path. By applying the continuity test to the series path, it is possible to determine that a continuous path exists through the normal contacts, and that accordingly, all the transfer contact controlling relays have released.

The system just described has one significant limitation, namely, that the application of a potential at one end of the transfer contact chain could result in that potential being applied over a still-operated make contact to one of the input lines if the associated transfer contact controlling relay had not released. Depending on the destination of the input lead, it is conceivable that the application of potential capable of operating a relay to that lead would create more of a problem than would the mere failure to release of that contact in the checking chain.

Accordingly, a circuit was required that would be capable of ascertaining the continuity of such a path without applying continuous potential to the path. It would also be advantageous if, at the same time, it could be ascertained whether any false crosses existed on this path; false crosses in this case include not only direct connections to battery or ground, but also resistive crosses.

The main object of this invention is to provide a continuity checking circuit which does not require the application of continuous potential to the conductor being checked.

A further object of this invention is to provide a checking circuit which is capable of detecting false crosses on the path being checked.

Still another object of this invention is to provide a checking circuit which automatically operates an alarm device upon failure of either the continuity or false cross check.

SUMMARY OF THE INVENTION

These and other objects of my invention are achieved in one illustrative embodiment for checking the continuity of, for example, a circuit path including a series of chained transfer contacts by simultaneously applying operating potential to a slow-operating alarm device and by applying a test pulse to one end of the series of chained transfer contacts. Detection of the applied test pulse at the other end of the test path prior to the complete operation of the alarm device is indicative of the absence of discontinuities or crosses on the tested conductor and results in the removal of operating potential from the alarm device.

Additional objects, features, and advantages of my invention will become apparent upon consideration of the description set forth hereinafter in conjunction with the single figure of the drawing which depicts an illustrative embodiment of a checking circuit in accordance with my invention.

GENERAL DESCRIPTION

Turning now to the drawing, I disclose a utilization circuit 160 which includes a conductor or electrical path 161 whose integrity is to be tested between terminals 101 and 104. A test and alarm circuit 100, in accordance with my invention, applies a pulse to the terminal 104 and detects that pulse at terminal 101, as further described below.

Utilization circuit 160 is illustrative of a prior art relay circuit containing a normally operated relay K and a plurality of relays, R1 through RN, each of which is operated through a respective contact K–1 through N–N of relay K. Each of relays R1 through RN is operable (through means not shown) to energize its associated work circuit 1 through N using make contacts R1–m through RN–m to connect the associated work circuits to energizing battery through make contact K–B. Work circuits 1 through N are representative of any circuit normally energized under control of a relay. When it is desired to restore utilization circuit 160 by de-energizing all of work circuits 1 through N, normally operated relay K is released (through means not shown). The release of relay K interrupts the operating path for relays R1 through RN at the respective make contacts K–1 through K–N of the K relay. The release of relays R1 through RN interrupts the energization paths of work circuits 1 through N at the respective make contacts R1–m through RN–m and make contact K–B. Break contacts R1–b through RN–b are serially connected by conductor 161, between terminals 101 and 104. Continuity between these terminals indicates that all the actuation relays R1 through RN, and hence the work circuits 1 through N controlled thereby, have properly released.

The continuity of test path 161 is ascertained by connecting the alarm and test circuit 100 of the present invention between terminals 101 and 104. Through means to be more fully described later, circuit 100 applies a short duration, positive potential pulse to terminal 104 of circuit 160. At the same time, a transistor 120 is turned on by this pulse to apply operating potential to a lead 105 to start turning on lamp 140. If the pulse applied to terminal 104 appears with sufficient magnitude at terminal 101, transistor 120 is turned off to remove the energizing potential from lead 105 thereby preventing lamp 140 from becoming fully lighted.

DETAILED DESCRIPTION

In the specific illustrative embodiment of my invention described herein, the test and alarm circuit 100 includes the transistor 120 which applies the energizing potential to the alarm lamp 140 and a transistor 126 and capacitor 127 which apply the test pulse to the terminal 104 of the path 161 to be tested. A relay KF is responsive to the utilization circuit 160 to initiate the test operations of the test and alarm circuit of my invention.

Transistor 126 in the lower right hand corner of test and alarm circuit 100 is normally conducting. Its emitter is connected to −48 volt battery and its base is normally held positive over a path from −26 volt battery, through resistor 123 and the forward biased diode 124. With transistor 126 conducting, capacitor 127 is normally charged over a path from ground through resistor 128 and through the conducting transistor to −48 volt battery. Transistor 120 at the upper right of circuit 100 is normally held nonconducting by normally closed contact KF–$m$ which prevents the junction of diode 133, diode 134 and diode 118 from going positive with respect to −48 volt battery. Relay KF at the upper left of test circuit 100 is normally held operated through make contact K–A of the normally operated K relay of utilization circuit 160. With transistor 120 nonconducting, the potential on lead 105 is not sufficient to energize alarm lamp 140. With relay KF normally operated, contacts KF–$b$ are open and capacitor 130 is charged to −26 volts through an obvious path including resistors 129 and 131.

When the normally operated K relay in circuit 160 is released, it de-energizes relays R1 through RN, whereupon all break contacts R1–$b$ through RN–$b$ are supposed to release and close. The release of relay K also opens the associated make contact K–A which interrupts the operating path of relay KF in test circuit 100 causing it to release. The release of relay KF opens make contact KF–$m$ which disconnects the cathode of diode 133 from −48 volt battery. At the same time, a path is completed at break contact KF–$b$ to connect −48 volt battery to the left side of capacitor 130. The right side of capacitor 130 therefore changes instantaneously from −26 volts to −74 volts. Diode 132 is rendered conductive by this large negative potential. Diode 132 conducting to −74 volts shunts down the relatively positive potential available through resistor 123. Diode 124 is accordingly no longer provided with forward bias through resistor 123 and transistor 126 turns off. With transistor 126 off, the potential on the right side of charged capacitor 127 shifts instantaneously from −48 volts to −26 volts provided through resistor 135. This 22 volt instantaneous positive potential change on the right side of capacitor 127 also appears on the left side of capacitor 127 and is applied to terminal 104 through resistor 150. When transistor 126 is turned off, the cathode of diode 134 also undergoes a change from −48 volts to −26 volts. The release of the KF relay contact KF–$m$ removes −48 volts from the cathode of diode 133. The junction of diodes 134, 133 and 118 is therefore no longer maintained at −48 volts. The base of transistor 120 is now forward biased by −26 volt battery through resistor 117 and transistor 120 turns on. With transistor 120 conducting, −48 volts is applied to lead 105 through resistor 122. The application of −48 volts to lead 105 energizes alarm lamp 140. However, since alarm lamp 140 is slow operating, it will not be illuminated immediately.

The generated positive pulse applied to terminal 104, as just described, passes through test conductor 161 which includes break contacts RN–$b$ through R1–$b$ of relays RN through R1, respectively. If there are no resistive crosses to battery or ground (shown dotted as schematic resistor 151) the positive pulse appearing at terminal 101 will only be attenuated by the negligible resistance of conductor 161, the slight resistance of contacts RN–$b$ through R1–$b$ and the voltage divider action of resistors 152 and 153. Since a battery is also a low impedance path to ground, the appearance of a cross directly to either battery or ground will have the similar effect of over-attenuating the applied pulse. Before the arrival of the positive-going pulse on terminal 101, capacitor 106 will normally have been charged so that its right hand plate at the junction of diodes 108, 109 and resistor 107 is at −48 volt battery. Transistor 111 is accordingly nonconducting. The appearance of a positive-going pulse at terminal 101 will be coupled by capacitor 106 to the junction of diodes 108 and 109. Diode 108 will be back biased and diode 109 forward biased to turn on transistor 111. When transistor 111 is conducting, current from the −26 volt battery in series with resistor 112 is applied to the base of transistor 114. If the positive pulse at terminal 101 has sufficient amplitude, transistor 114 will become saturated and turn on. With transistor 114 on, diode 118 is once again back biased by the appearance of −48 volts at its anode through transistor 114 and diode 116. With diode 118 back biased, transistor 120 turns off and removes energizing potential from alarm lamp 140 before the lamp reaches full energization and gives an alarm indication.

Transistor 126 is held off while transistor 120 is on since the −26 volt battery appearing at resistor 123 is shunted to −48 volt battery through diode 121 and conducting transistor 120. This insures that diode 124 will not become forward biased. When transistor 120 turns off, as described immediately above, this shunt path is interrupted and the −26 volt battery at resistor 123 is once again able to forward bias diode 124 and turn on transistor 126. When transistor 126 becomes conducting, the path through conducting transistor 114 to −48 volt battery, which shunts the −26 volt battery at resistor 117, is supplemented by a second shunt path through diode 134 and conducting transistor 126 to −48 volt battery. This supplementary shunt path insures that diode 118 will still be held back biased at the cessation of the applied positive going pulse, thereby preventing transistor 120 from turning back on.

If the positive-going applied to terminal 104 failed to appear at terminal 101 because one or more of relays R1 through RN failed to release, transistor 111 would not be turned on and it in turn would not turn off transistor 120. Lamp 140 would become fully energized and be recognized as an alarm signal. Similarly, the presence of a resistive cross 151 to either battery or ground will result in the over-attenuation of the applied positive-going pulse. The pulse, if any, appearing at the junction of diodes 108 and 109 would be of insufficient amplitude to saturate transistor 114. As a result, transistor 120 would not be turned off, energizing potential would not be removed from lead 105, and alarm lamp 140 would fully energize to indicate a test failure. Diode 121 serves to isolate lead 105 from the effects of any voltage variations occurring as capacitor 130 is charged and discharged. This insures that the operating path for lamp 140 is completed only through transistor 120. If the test had been successful, the K relay could now be re-operated and the circuits would be enabled for subsequent operation as previously described.

It should be readily apparent to those skilled in the art that the alarm circuit may include an arrangement to prevent the automatic operation of relay K when a test failure occurs.

It is to be understood that the above-described circuit is illustrative of the application of the principles of my invention; numerous other circuits may be devised by those skilled in the art without departing from the spirit and scope of my invention.

What is claimed is:

1. A circuit for testing the integrity of an electrical path comprising
   normally released slow operating alarm means,
   pulse source means,
   means for applying a pulse from said pulse source to one end of said electrical path and simultaneously applying energizing potential to said alarm means, said alarm means, said alarm means beginning to operate in response to the application of said energizing potential, means coupled to the other end of said electrical path for detecting the appearance thereat of said pulse, and means controlled by said detecting means for disabling said alarm means in response to the detection of said applied pulse before said alarm has fully operated.

2. A circuit according to claim 1 wherein said means for disabling said alarm means includes means controlled by said detecting means for removing said energized potential from said alarm means in response to the detection of said applied pulse.

3. A circuit for testing the integrity of an electrical path comprising pulse source means;

means for applying a pulse from said pulse source to one end of said electrical path and which includes a circuit having a normally conducting first transistor and capacitor means coupling said first transistor to said one end of said electrical path, said capacitor means being charged through said first transistor;

means coupled to the other end of said electrical path for detecting the appearance thereat of said pulse;

slow operating alarm means which includes an alarm device and a second transistor for completing an operating path to said alarm device, energizing potential for said alarm means applied by said pulse applying means with said alarm means beginning to operate in response to the application of said energizing potential;

diode means connected between said first transistor circuit and said second transistor for maintaining said second transistor back biased so long as said first transistor is in said conducting state;

means for turning off said first transistor to initiate a test of said electrical path; and means controlled by said detecting means for disabling said alarm means before said alarm has fully operated.

4. A circuit according to claim 3 wherein said means for turning off said first transistor includes time constant charging means for for maintaining said first transistor nonconducting for an interval exceeding the operating time of said slow operating alarm means.

5. A test and alarm circuit for determining the integrity of an electrical path through a conductor comprising normally released alarm means having slow-operating characteristics;

means for simultaneously applying an energization potential to said alarm means and a pulse in excess of a minimum amplitude to one end of said tested conductor;

detector means responsive to pulses of at least said minimum amplitude connected to the other end of said conductor and energizable to indicate the presence at said other end of said applied pulses; and means controlled by said detector means for removing said energization potential from said alarm means upon detection of said applied pulse of at least said minimum amplitude thereby preventing the complete energization of said alarm means.

6. A test and alarm circuit for ascertaining the integrity of an electrical path comprising means for initiating a test of said electrical path, alarm means having slow-operating characteristics and operable to indicate failure of said test, start means connected to said initiating means and controlled thereby for generating a first pulse;

normally energized first transistor means connected to said start means and de-energizing in response to generation of said first pulse, normally de-energized second transistor means connected to said first transistor, said second transistor means being energizable upon the de-energization of said first transistor to apply operating potential to said alarm means, pulse means controlled by said first transistor becoming de-energized for applying a test pulse to one end of said electrical path, normally de-energized third transistor means connected to the other end of said electrical path and energizable in response to the appearance of a pulse of at least a minimum amplitude thereat for de-energizing said second transistor means thereby removing said operating potential from said alarm means prior to said alarm means becoming fully operated.

References Cited

UNITED STATES PATENTS

| | | | |
|---|---|---|---|
| 3,250,992 | 5/1966 | Cronkite et al. | 324—66 |
| 3,257,654 | 6/1966 | Rogers et al. | 340—309.1X |
| 3,277,364 | 10/1966 | Abrahamson | 324—54 |
| 3,281,810 | 10/1966 | Thornberg et al. | 340—309.1X |
| 3,364,419 | 1/1968 | Anderson | 324—28 |

GERARD R. STRECKER, Primary Examiner

U.S. Cl. X.R.

340—253